(12) United States Patent
Gao et al.

(10) Patent No.: US 8,320,667 B2
(45) Date of Patent: Nov. 27, 2012

(54) AUTOMATIC AND SCALABLE IMAGE SELECTION

(75) Inventors: Yuli Gao, Palo Alto, CA (US); Phil Cheatle, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 947 days.

(21) Appl. No.: 12/392,585

(22) Filed: Feb. 25, 2009

(65) Prior Publication Data

US 2010/0215279 A1  Aug. 26, 2010

(51) Int. Cl.
*G06K 9/00* (2006.01)
(52) U.S. Cl. ...................................................... 382/165
(58) Field of Classification Search .................. 382/165, 382/218–219, 224–226, 228, 284, 294; 358/1.9, 358/1.18, 537; 348/231.9; 715/255; 345/660
See application file for complete search history.

(56) References Cited

U.S. PATENT DOCUMENTS

| 7,148,990 | B2* | 12/2006 | Atkins et al. | 358/1.18 |
| 7,768,535 | B2* | 8/2010 | Reid et al. | 345/660 |
| 2004/0032599 | A1* | 2/2004 | Atkins et al. | 358/1.9 |
| 2006/0050337 | A1* | 3/2006 | Hitaka et al. | 358/537 |
| 2006/0259863 | A1 | 11/2006 | Obrador et al. | |
| 2008/0043259 | A1* | 2/2008 | Triplett et al. | 358/1.9 |
| 2009/0022424 | A1* | 1/2009 | Chen et al. | 382/284 |
| 2011/0173531 | A1* | 7/2011 | Hitaka et al. | 715/255 |

* cited by examiner

*Primary Examiner* — Duy M Dang (57) ABSTRACT

In a method for automatically and scalably selecting images from an image collection for inclusion in a photo album, an initial pagination arrangement containing a subset of all of the images contained in the image collection is identified. In addition, a determination as to whether the initial number of pages of the initial pagination arrangement is equivalent to a desired number of pages is made and the initial pagination arrangement is modified in an automatic and scalable manner in response to the initial number of pages differing from the desired number of pages.

20 Claims, 5 Drawing Sheets

AUTOMATIC AND SCALABLE IMAGE SELECTION

CROSS-REFERENCE TO RELATED APPLICATION

The present application shares some common subject matter with commonly assigned U.S. Pat. No. 7,908,558, filed on May 12, 2005, which names Pere Obrador et al, as inventors, PCT Application Serial No. PCT/US08/73874, filed on Aug. 21, 2008, which names Pere Obrador as the inventor, and U.S. Provisional Patent Application Ser. No. 61/108,523, filed on Oct. 26, 2008, which names Yuli Gao et al, as inventors, the disclosures of which are hereby incorporated by reference in their entireties.

BACKGROUND

With the advent and proliferation of digital cameras and video recorders, along with increased data storage capabilities at increasingly lower costs, it has become common for users to collect ever increasing numbers of images in a collection. For instance, it is not uncommon for users to take hundreds of digital images during a single event, such as, a wedding, a vacation, and a party. When a user wishes to create a photo album, photobook, or a slideshow containing some of the images, the user typically arranges the photographs in chronological order, based on scene content, or the person who captured the photographs. However, due to the relatively large number of images, users often spend a great deal of time in sorting through the image collection to determine which of the images to include.

Conventional systems for automatic image classification have been applied to multiple images stored in a database. The classification has been used to index images so that the images may be categorized, browsed, and retrieved. In addition, images have been stored in the database with descriptive information regarding the image file, such as, the file creation date, file name, and file extension. Techniques used for image classification are, for the most part, similar to classification techniques applied to any form of digital information.

An exemplary image classification technique provides for navigation through a collection of images to facilitate image retrieval. The appearance of an image is summarized by distribution of color or texture features, and a metric is defined between any two such distributions. A measure of perceptual dissimilarity is provided to assist in image retrieval. Two or three-dimensional Euclidean space has been used to evaluate differences in distances between images to highlight image dissimilarities. The results may be used to assist in a database query for locating a particular image.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are an apparatus and a method for automatically and scalably selecting images from an image collection for inclusion in a photo album (or photo book, calendar, etc.). More particularly, for instance, in response to an initial pagination arrangement resulting in a number of pages that differs from a desired number of pages, the initial pagination arrangement is modified in an ordered and iterative manner to identify a modified pagination arrangement that has the desired number of pages. In one regard, the apparatus and method disclosed herein generally enables a scalable pagination operation to be performed to output a photo album having the desired number of pages, while substantially minimizing inclusion of unwanted images.

Figure 1:
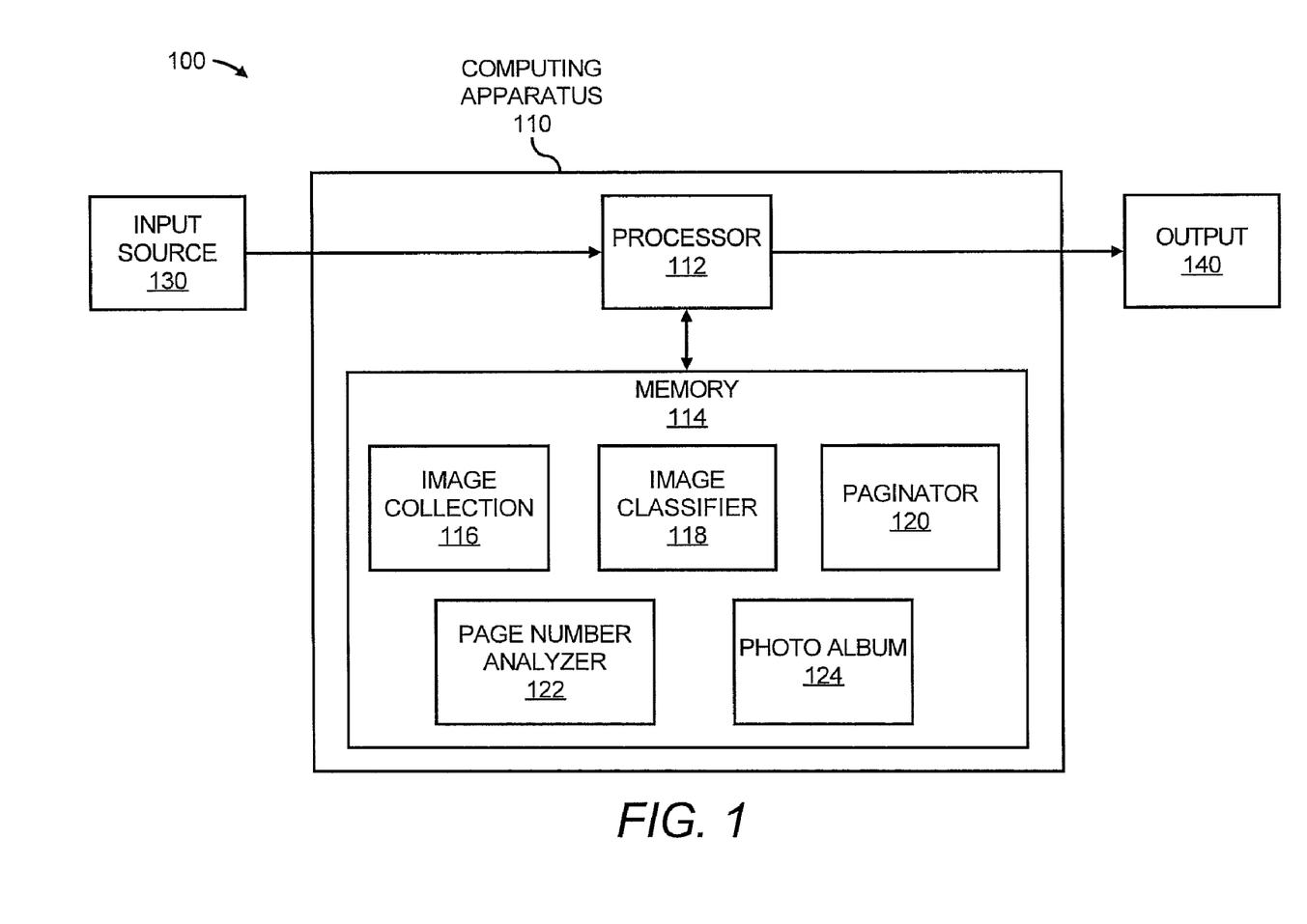
FIG. 1 shows a simplified block diagram of a computer-implemented system having a computing apparatus for automatically and scalably selecting images from an image collection for inclusion in a photo album, according to an embodiment of the invention.

With reference first to FIG. 1, there is shown a simplified block diagram of a computer-implemented system 100 for automatically and scalably selecting images from an image collection for inclusion in a photo album, according to an example. In one regard, the various methods and systems disclosed herein may be implemented in the computer-implemented system 100 depicted in FIG. 1 as discussed in greater detail herein below. It should be understood that the system 100 may include additional components and that some of the components described herein may be removed and/or modified without departing from a scope of the system 100. Although particular reference is made throughout the present disclosure to a photo album, it should be understood that the photo album 124 may be replaced with a photo book, calendar, or other collection of images without departing from a scope of the invention.

As shown in FIG. 1, the system 100 includes a computing apparatus 110, an input source 130, and an output 140. The computing apparatus 110 includes a processor 112 and a memory 114, which stores an image collection 116. Alternatively, however, the image collection 116 may be stored in a separate data storage device, such as, an external data storage device, etc. In any regard, the image collection 116 may comprise all of the image files contained in a single file folder, a subset of the all of the image files contained in the single file folder, the images contained in a plurality of file folders, etc.

As referenced herein, an "image" is any image or electronic data file that is stored in electronic form in any type of electronic storage medium or computer memory. An image may be any digital image captured from any type of digital capturing device, such as, without limitation, digital video cameras, digital still cameras, video capture cards, or other image capturing device. An image may alternately be an analog image captured from, for example, any camera, video camera, or analog image capture source or device, that are scanned or otherwise digitized and stored as a digital image.

An image may also be an electronic document, such as, for example, a multimedia document that contains images, video, sound, etc. Those skilled in the art will recognized that the image can be any type of electronic file that a user may access from a collection of electronic data file.

The processor 112 is configured to control various operations performed in the computing apparatus 110. The operations include the implementation of an image classifier 118, a paginator 120, and a page number analyzer 122 to automatically create a pagination arrangement that includes a desired number of pages containing images from the image collection 116 for inclusion in a photo album 124 (or photo book, calendar, etc.). The desired number of pages may be user-defined to, for instance, enable the user to decide upon the amount of cost that the user is willing to incur in printing the photo album 124. Thus, for instance, the user may select a lesser value for the desired number of pages if the user desires to incur a relatively lower cost for printing the photo album 124. Various manners in which the processor 112 may automatically select the images for the photo album 124 while remaining within the desired number of pages is discussed in greater detail herein below.

Generally speaking, the photo album 124 is configured to include a plurality of images from the image collection 116, such as a subset of images from the image collection 116. The plurality of images may be arranged in the pages of the photo album 124 based upon one or more characteristics, such as, locations where the images were captured, identifications of people contained in the images, time frames of when the images were captured, etc., of the images. For instance, images containing one or more similar characteristics may be placed on the same and/or facing pages of the photo album 124.

According to an example, the processor 112 comprises a microprocessor circuit or the like. In addition, the image classifier 118, the paginator 120 and the page number analyzer 122 comprise computer programs or software stored in the memory 114. The processor 112 is configured to implement or execute the image classifier 118, the paginator 120, and the page number analyzer 122 to automatically select images from the image collection 116 for inclusion in a photo album as discussed in greater detail herein below.

The memory 114 comprises any reasonably suitable device capable of storage of information or any combination of devices capable of storage of information, such as, a semiconductor device, a magnetic disk memory device, nonvolatile memory devices, such as, an EEPROM or CDROM, etc. The memory 114 may also comprise a fixed or removable data storage device. In addition to storing the image collection 116, the image classifier 118, the paginator 120, and the page number analyzer 122, the memory 114 may also store one or more program instructions or code, which the processor 112 may execute in performing various other operations of the computing apparatus 110.

The input source 130 may comprise a user interface, such as, a keyboard, mouse, touchscreen display, another computing apparatus, etc., that a user may use in inputting data into the computing apparatus 110. For instance, a user may employ the input source 130 to input information pertaining to the number of pages desired for the photo album, the maximum number of images to be included on the pages, etc. The user may also employ the input source 130 to tag selected ones of the images as being mandatory for inclusion in the photo album 124, as being grouped with another image, as being of relatively higher or lower importance, such as, by allocating star ratings to the images, etc. The user may further employ the input source 130 to input instructions into the computing apparatus 110 for initiating an automatic image selection operation.

The output 140 may comprise any reasonably suitable apparatus to which the photo album 124 may be outputted. The output 140 may thus comprise, for instance, a display monitor, a printer, another computing apparatus, a data storage device, a server connected to the computing apparatus 110 via the Internet, a kiosk having a printer configured to charge a fee for printing services, etc.

Although not shown, the computing apparatus 110 may include additional components, such as, a communication bus, a secondary memory, and a removable storage device. The computing apparatus 110 may also be interfaced with user input and output devices, such as, a keyboard, a mouse, and a display. In addition, the processor 112 may communicate the photo album 124 over a network, for instance, the Internet, LAN, etc., through a network adaptor.

An example of a method in which the computing apparatus 110 may be employed to automatically and scalably select images from an image collection 116 for inclusion in a photo album 124 will now be described with respect to the following flow diagrams of the methods 200 and 300 depicted in FIGS. 2 and 3A-3C. Generally speaking, the method 300 comprises many of the same steps as in the method 200, but provides a more detailed description of those steps. It should be apparent to those of ordinary skill in the art that other steps may be added or existing steps may be removed, modified or rearranged without departing from the scopes of the methods 200 and 300.

The descriptions of the methods 200 and 300 are made with reference to the computing apparatus 110 illustrated in FIG. 1, and thus make reference to the elements cited therein. It should, however, be understood that the methods 200 and 300 are not limited to the elements set forth in the system 100. Instead, it should be understood that either or both of the methods 200 and 300 may be practiced by a computing apparatus having a different configuration than that set forth in FIG. 1.

Some or all of the operations set forth in the methods 200 and 300 may be contained as a utility, program, or subprogram, in any desired computer accessible medium. In addition, the methods 200 and 300 may be embodied by computer programs, which may exist in a variety of forms both active and inactive. For example, they may exist as software program(s) comprised of program instructions in source code, object code, executable code or other formats. Any of the above may be embodied on a computer readable medium.

Exemplary computer readable storage devices include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

The processor 112 may implement or execute the methods 200 and 300 to automatically and scalably select images from an image collection for inclusion in a photo album 124, in which, the photo album 124 is configured to contain a desired number of pages.

Figure 2:
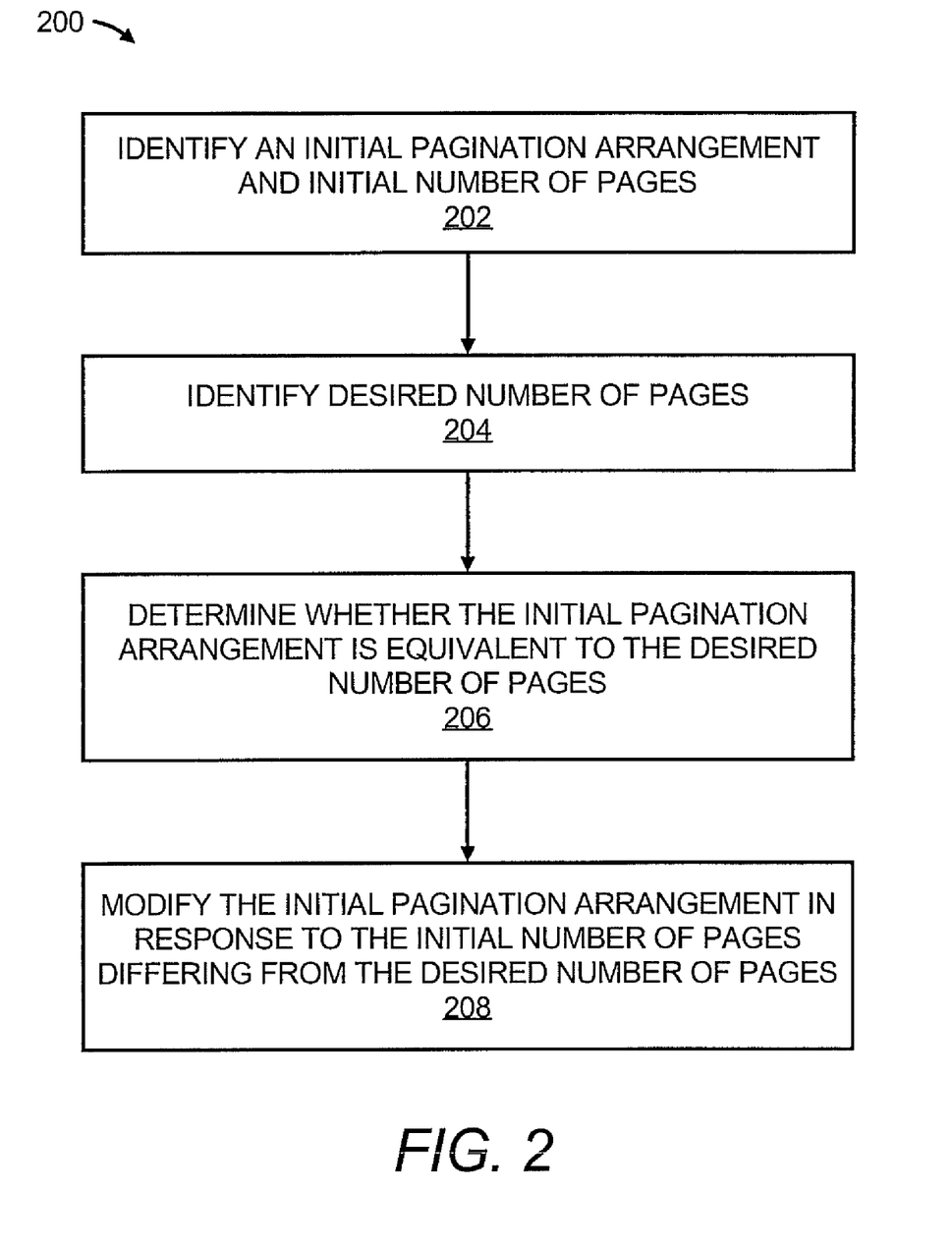
FIG. 2 illustrates a flow diagram of a method of automatically and scalably selecting images from an image collection for inclusion in a photo album, according to an embodiment of the invention.

With reference first to FIG. 2, at step 202, an initial pagination arrangement for the photo album 124 is identified. By way of example, the processor 112 may implement, invoke, or execute the paginator 120 to make the initial pagination arrangement identification. According to an example, the initial pagination arrangement is an arrangement of images that includes a subset of the images contained in the image collection 116. More particularly, the initial pagination arrangement defines an initial determination of how the subset of images are to be arranged in the photo album 124, which results in an initial number of pages for the photo album 124. The initial pagination arrangement (P) may be defined as:

$$P = \{p_1, p_2, \ldots, p_n\}, \text{ given a set of images } (I), \quad \text{Equation (1):}$$

$$I = \{I_1, I_2, \ldots, I_n\}. \quad \text{Equation (2)}$$

From Equations (1) and (2), each page ($p_i$) of the photo album 124 is denoted as being composed of $p_{i-m}$ images:

$$p_i = \{I_{Pi-1}, I_{Pi-2}, \ldots, I_{Pi-n}\}. \quad \text{Equation (3)}$$

In Equation (3), $p_{i-m}$ is an integer between [1, M], in which M is the maximum number of images allowed on any page of the photo album 124. The maximum number (M) of images allowed on any page of the photo album 124 may be defined by a user to, for instance, control the minimum and maximum dimensions that the images may have in the photo album 124.

At step 204, the computing apparatus 110 identifies the desired number of pages. More particularly, for instance, the processor 112 identifies the desired number of pages from input received from the user that defines the desired number of pages. Thus, for instance, the processor 112 may receive the desired number of pages from the user when the processor 112 receives an instruction to perform the automatic image selection operation and the processor 112 may store the desired number of pages from the user. In another example, the processor 112 identifies the desired number of pages from a user-selected photo album 124 having a predefined number of pages. In this example, the photo album 124 may comprise a themed photo album having predetermined themes on each of preset page layouts in the photo album.

At step 206, a determination as to whether the initial number of pages (n) is equivalent to the desired number of pages (k) is made. More particularly, for instance, the processor 112 implements or invokes the page number analyzer 122 to make this determination. In the event that the initial number of pages (n) differs from the desired number of pages (k), at step 208, the initial pagination arrangement is modified in an automatic and scalable manner to have a different number of pages than the initial number of pages (n). Various manners in which the initial pagination arrangement may be modified are described in greater detail herein below with respect to FIGS. 3A-3C.

Figure 3A:
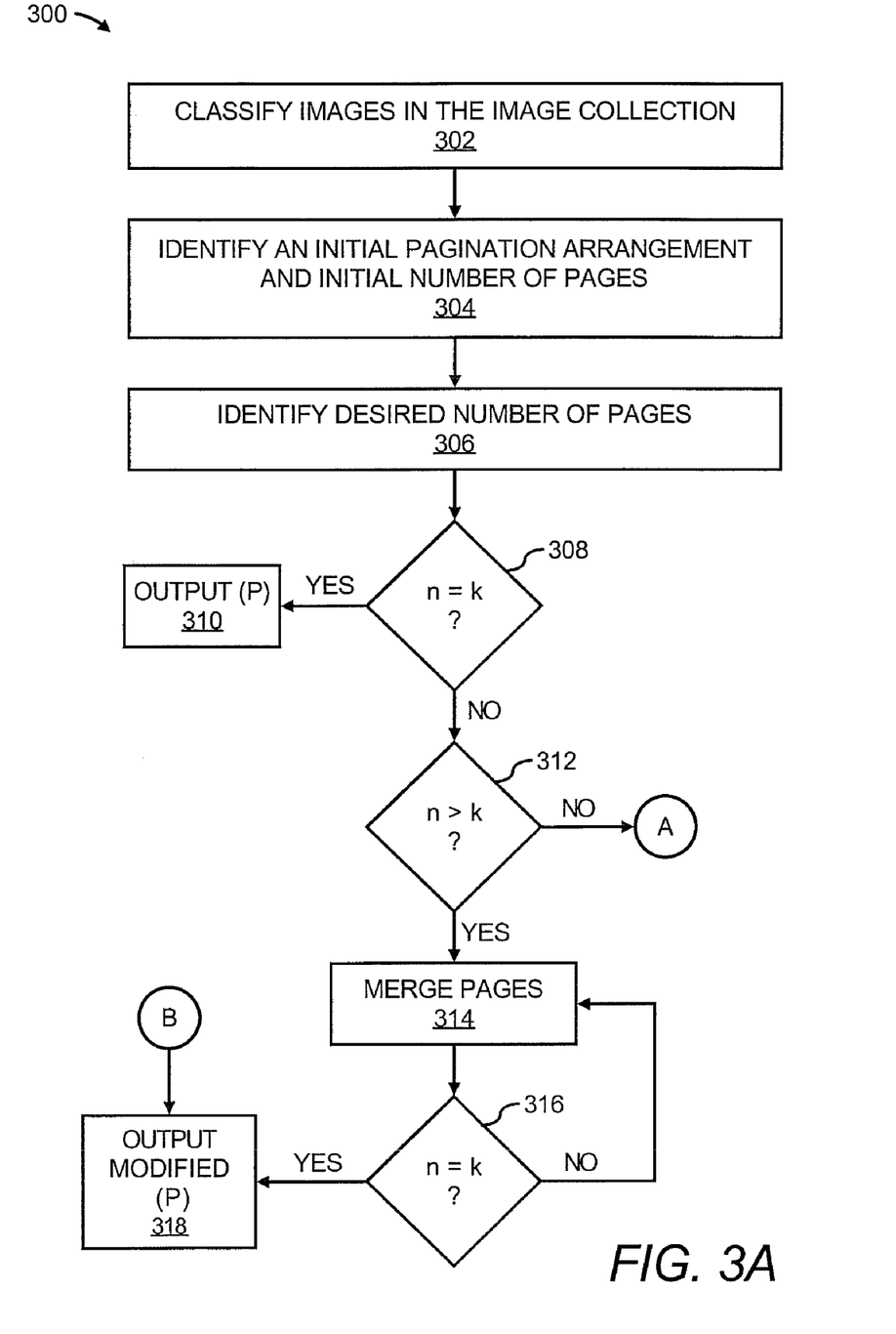
FIGS. 3A-3C, collectively, show a flow diagram of a method of automatically and scalably selecting images from an image collection for inclusion in a photo album, which is a more detailed depiction of the flow diagram depicted in FIG. 2, according to an embodiment of the invention.
Figure 3B:
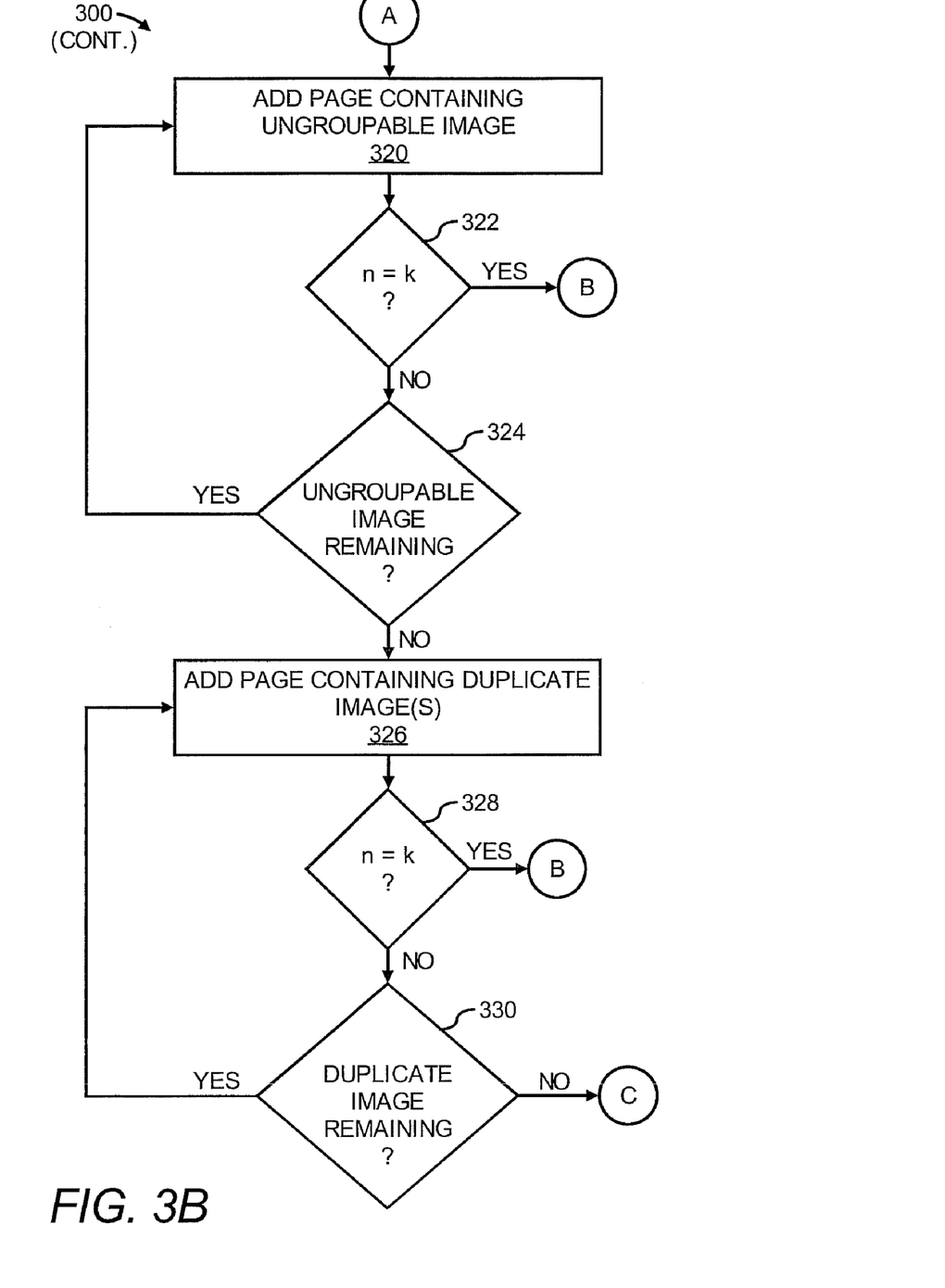
Figure 3C:
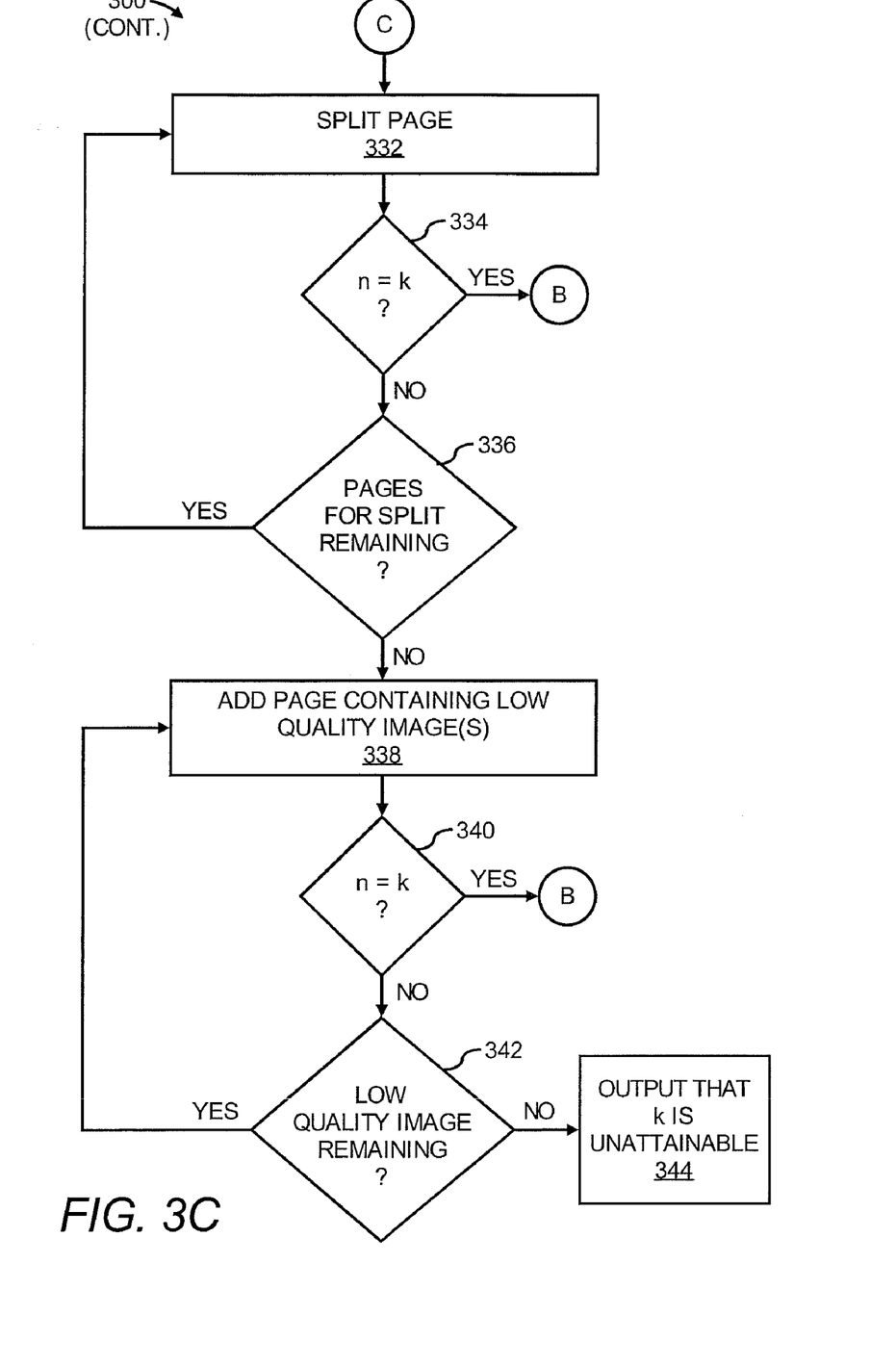

Turning now to FIGS. 3A-3C, at step 302, the images contained in the image collection 116 or a subset of all of the images contained in the image collection 116 are classified into one or more categories. More particularly, for instance, the processor 112 may implement or invoke the image classifier 118 to classify the images. The image classifier 118 may classify the images as being one or more of having a relatively low image quality (such as, blurry or boring images), as being a duplicate of another image, as being ungroupable with at least one other image, as being of relatively higher or lower importance, etc. Ungroupable images may include those images for which the image collection 116 does not contain a related image. Images may be considered to be related to each other if they share a particular dimension, such as, a time frame during which the images were captured, common characters or objects in multiple images, common color characteristics, etc. The relative importance of the images may be user-defined and/or based upon the contents of the images.

The image classifier 118 may classify the images into the categories through use of any reasonably suitable classification operation. Various examples of suitable manners in which the image classifier 118 may classify the images are described in U.S. Patent Application Publication Serial No. 2006/0259863 and in PCT Application Serial No. PCT/US08/73874.

The image classifier 118 may also classify one or more of the images as being suitable for initial inclusion in the photo album 124. More particularly, for instance, the image classifier 118 may classify those images that are not classified as being of relatively low image quality and those images that are not classified as being ungroupable with at least one other image as being suitable for initial inclusion in the photo album 124. In addition, for each of the sets of duplicate images, the image classifier 118 may classify one of the images as being suitable for initial inclusion in the photo album 124. For instance, the image classifier 118 may classify the images having the best image quality in each of the sets of duplicate images as being suitable for initial inclusion in the photo album 124. The image classifier 118 may also rank the images classified into each of the categories, such that, for instance, those images having the highest image qualities and/or the highest relative importance levels have the highest rankings in each of the respective categories.

At step 304, an initial pagination arrangement for the photo album 124 is identified. More particularly, for instance, the processor 112 may implement or invoke the paginator 120 to make the initial pagination arrangement identification. In one respect, the initial pagination arrangement may be identified to include a subset of the images contained in the image collection 116. The subset of images may include those images that have been identified as being suitable for initial inclusion in the photo album 124. In other words, the subset of images may include the images that have not been classified as being one or more of a relatively low quality image, a duplicate image, an ungroupable image, and a relatively low importance image.

In addition, the identification of the initial pagination arrangement includes identifying how the selected images are to be arranged in the photo album 124. In other words, the paginator 120 may determine which of the images are to be included on which of the photo album 124 pages. The paginator 120 may make this determination through application of any reasonably suitable process for arranging the images according to one or more features of the images. By way of particular example, the paginator 120 is configured to arrange the images based upon one or more themes. In this example, the images may be arranged according to some measure of similarity in some dimension, such as, time, color, people, places, etc. A suitable example of a manner in which the paginator 120 may arrange the images in the initial pagination arrangement is disclosed in U.S. Provisional Patent Application Ser. No. 61/108,523. In any regard, the identification of the initial pagination arrangement at step 304 results in an identification of an initial number of pages (n) for the initial pagination arrangement.

At step 306, the desired number of pages (k) that the photo album 124 is to have is identified. The desired number of pages (k) may be identified in any of the manners discussed above with respect to step 204 in FIG. 2.

At step 308, a determination of whether the initial number of pages (n) is equivalent to the desired number of pages is made. More particularly, for instance, the processor implements or invokes the page number analyzer 122 to make this determination. If the initial number of pages (n) is determined to be equivalent to the desired number of pages (k), the processor 112 may output the photo album 124 with the initial pagination arrangement as indicated at step 310. Thus, for instance, the processor 112 may cause the output 140 to print the photo album 124 to have the initial pagination arrangement. As another example, the processor 112 may cause the photo album having the initial pagination arrangement to be displayed on a monitor for viewing and further possible modification by a user.

If, however, the initial number of pages (n) differs from the desired number of pages (k), a determination of whether the initial number of pages (n) is lesser than or greater than the desired number of pages (k) is made at step 312. If the initial number of pages (n) is greater than the desired number of pages (k), two or more of the pages may be merged with each other to thereby reduce the total number of pages in the initial number of pages (n), as indicated at step 314. According to an example, the two or more pages may be merged through a binary merging operation. In this example, the pages of the initial pagination arrangement may be prioritized based upon the average similarities among the pages, in which the similarities may be based upon a dimension, such as, time, color, people, places. As such, the pages having the largest average similarity with respect to each other will have the highest ranking and will thus be merged prior to other pages.

Thus, at step 314, two of the pages having the highest ranking are merged and the merged page replaces the two pages. In instances where the merged page contains more images than the maximally allowed number of images (M), a stratified sampling across the original pages is performed to obtain a fair representation of the images contained in both of the original pages. In stratified sampling, an image is sampled from the first page and an image is then sampled from the second page, and so forth, until the maximum allowed number of images (M) for the merged page is reached. The order in which the images are sampled from the first page and the second page may be based upon a weighting of each of the images, such as, based upon the quality of the images, contained in the pages. Thus, those images having the highest weightings are sampled first. In other examples, other types of sampling may be employed, such as, random sampling, sampling according to image importance, etc., to merge pages of images together. In any regard, the initial pagination arrangement is modified at step 314 to include the merged page and thus has a new number of pages (n).

At step 316, a determination as to whether the number of pages (n) for the modified pagination arrangement is equivalent to the desired number of pages (k) is made. If the number of pages (n) for the modified pagination arrangement differs from the desired number of pages (k), another set of pages is merged at step 314. In this iteration of step 314, the pages having the next highest similarity ranking may be merged. In addition, steps 314 and 316 may be iteratively performed until the number of pages (n) for the modified pagination arrangement equals the desired number of pages (k) at step 316.

When the number of pages (n) is determined to equal the desired number of pages (k), the processor 112 outputs the modified pagination arrangement as indicated at step 318. Thus, for instance, the processor 112 may cause the output 140 to print the photo album 124 to have the modified pagination arrangement. As another example, the processor 112 may cause the photo album having the modified pagination arrangement to be displayed on a monitor for viewing and further possible modification by a user.

With reference back to step 312, if the initial number of pages (n) is lesser than the desired number of pages (k), which is the "no" condition at step 312, a page containing an ungroupable image is added to the initial pagination arrangement, as indicated at step 320 (FIG. 3B). In instances where more than one ungroupable image is contained in the image collection 116, the ungroupable images may be prioritized based upon, for instance, the quality of the ungroupable images. As such, for example, during a first iteration of step 320, a page is added to contain the ungroupable image having the highest ranking. In any regard, the initial pagination arrangement is modified at step 320 to include the page containing the ungroupable image and thus has a new number of pages (n).

At step 322, a determination of whether the number of pages (n) for the modified pagination arrangement is equivalent to the desired number of pages (k) is made. More particularly, for instance, the processor 112 implements, invokes, or executes the page number analyzer 122 to make this determination. If the number of pages (n) for the modified pagination arrangement is determined to be equivalent to the desired number of pages (k), the processor 112 may output the photo album 124 with the modified pagination arrangement as discussed above with respect to step 318 (FIG. 3A).

If the number of pages (n) for the modified pagination arrangement is determined to differ from the desired number of pages (k) and thus the number of pages (n) remains smaller than the desired number of pages, a determination as to whether the image collection 116 contains an additional ungroupable image is made at step 324. If the image collection 116 contains an additional ungroupable image, another page containing the additional ungroupable image is added to the modified pagination arrangement at step 320. In addition, steps 320-324 may be iteratively performed until the number of pages (n) for the modified pagination arrangement is determined to equal the desired number of pages (k) at step 322 or until the image collection 116 is determined to contain no additional ungroupable images at step 324.

If the image collection 116 is determined to contain no additional ungroupable images at step 324, which indicates that the modified number of pages is still smaller than desired and that the ungroupable images have been exhausted, a page containing one or more duplicate images is added to the modified pagination arrangement at step 326. In instances where more than one duplicate image is contained in the image collection 116, the duplicate images may be prioritized based upon, for instance, the respective qualities of the duplicate images. As such, for example, during a first iteration of step 326, a page containing one or more duplicate images having the highest rankings are added. In any regard, the modified pagination arrangement is modified at step 326 to include the page containing the one or more duplicate images and thus has a new number of pages (n).

At step 328, a determination of whether the number of pages (n) for the modified pagination arrangement is equivalent to the desired number of pages (k) is made. If the number of pages (n) for the modified pagination arrangement is determined to be equivalent to the desired number of pages (k), the processor 112 may output the photo album 124 with the modified pagination arrangement as discussed above with respect to step 318 (FIG. 3A).

If the number of pages (n) for the modified pagination arrangement is determined to differ from the desired number of pages (k) and thus the number of pages (n) remains smaller than the desired number of pages, a determination as to whether the image collection 116 contains an additional duplicate image is made at step 330. If the image collection 116 contains an additional duplicate image, another page containing the additional duplicate image is added to the modified pagination arrangement at step 326. In addition, steps 326-330 may be iteratively performed until the number of pages (n) for the modified pagination arrangement is determined to equal the desired number of pages (k) at step 328 or until the image collection 116 is determined to contain no additional duplicate images at step 330.

If the image collection 116 is determined to contain no additional duplicate images at step 330, which indicates that the modified number of pages is still smaller than desired and that the duplicate images have been exhausted, a page containing a plurality of images is split at step 332 (FIG. 3C). The determination of which page to split at step 332 may be based upon any of a plurality of factors, such as, which page has the most number of images, which page contains the most separately groupable images, etc. In addition, the pages may be ranked with respect to each other according to one or more of these factors. In another example, however, the page to be split may randomly be selected. According to a particular example, a page is split in a manner that favors appearance-homogeneity, such that, images within a new page are more similar to each other as compared with the images contained in another new page. The appearance-homogeneity may be achieved through, for instance, a graph cut operation on a color similarity graph.

In any regard, the modified pagination arrangement is modified at step 332 to include the split pages and thus has a new number of pages (n). At step 334, a determination of whether the number of pages (n) for the modified pagination arrangement is equivalent to the desired number of pages (k) is made. If the number of pages (n) for the modified pagination arrangement is determined to be equivalent to the desired number of pages (k), the processor 112 may output the photo album 124 with the modified pagination arrangement as discussed above with respect to step 318 (FIG. 3A).

If the number of pages (n) for the modified pagination arrangement is determined to differ from the desired number of pages (k) and thus the number of pages (n) remains smaller than the desired number of pages, a determination as to whether the modified pagination arrangement contains any additional pages to be split is made at step 336. If the modified pagination arrangement contains an additional page to be split, another page is split at step 332. In addition, steps 332-336 may be iteratively performed until the number of pages (n) for the modified pagination arrangement is determined to equal the desired number of pages (k) at step 334 or until the modified pagination arrangement is determined to contain no additional pages to be split at step 336.

If the modified pagination arrangement is determined to contain no additional pages to be split at step 336, which indicates that the modified number of pages is still smaller than desired and that each of the pages in the modified pagination arrangement contains a single image, a page containing one or more low quality images is added to the modified pagination arrangement at step 338. In instances where more than one low quality image is contained in the image collection 116, the low quality images may be prioritized based upon, for instance, the respective qualities of the low quality images. As such, for example, during a first iteration of step 338, a page containing one or more low quality images having the highest rankings are added. In any regard, the modified pagination arrangement is modified at step 338 to include the page containing the one or more low quality images and thus has a new number of pages (n).

At step 340, a determination of whether the number of pages (n) for the modified pagination arrangement is equivalent to the desired number of pages (k) is made. If the number of pages (n) for the modified pagination arrangement is determined to be equivalent to the desired number of pages (k), the processor 112 may output the photo album 124 with the modified pagination arrangement as discussed above with respect to step 318 (FIG. 3A).

If the number of pages (n) for the modified pagination arrangement is determined to differ from the desired number of pages (k) and thus the number of pages (n) remains smaller than the desired number of pages, a determination as to whether the image collection 116 contains an additional low-quality image is made at step 342. If the image collection 116 contains an additional low quality image, another page containing the additional low quality image is added to the modified pagination arrangement at step 338. In addition, steps 338-342 may be iteratively performed until the number of pages (n) for the modified pagination arrangement is determined to equal the desired number of pages (k) at step 340 or until the image collection 116 is determined to contain no additional low quality images at step 342.

If the image collection 116 is determined to contain no additional low quality images at step 342, which indicates that the modified number of pages is still smaller than desired and that there are no additional images available to be added to increase the page number of the modified pagination arrangement, an indication that the desired number of pages is unattainable is outputted at step 344.

The method 300 may thus end at any of steps 310, 318 and 344 depending upon when various conditions are met. In this regard, the method 300 generally comprises a scalable pagination operation configured to output a photo album having the desired number of pages, while substantially minimizing inclusion of typically unwanted images. Through implementation of the method 300 and a computing apparatus 110 configured to implement the method 300, when the initial pagination arrangement results in a number of pages that differs from a desired number of pages, the initial pagination arrangement is modified in an ordered and iterative manner to identify a modified pagination arrangement that has the desired number of pages.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A non-transitory computer readable storage medium on which is embedded one or more computer programs, said one or more computer programs implementing a method for automatically and scalably selecting images from an image collection for inclusion in a photo album, said one or more computer programs comprising a set of instructions for:

identifying an initial pagination arrangement containing a subset of all of the images contained in the image collection, wherein the initial pagination arrangement contains an initial number of pages;

determining whether the initial number of pages is equivalent to a desired number of pages; and modifying the initial pagination arrangement in an automatic and scalable manner in response to the initial number of pages differing from the desired number of pages.

2. The non-transitory computer readable storage medium according to claim 1, said one or more computer programs further comprising a set of instructions for:

determining whether the initial number of pages exceeds the desired number of pages; and in response to a determination that the initial number of pages exceeds the desired number of pages, modifying the initial pagination arrangement by iteratively reducing the initial number of pages through a merging operation of the images contained in two or more of the pages until the initial number of pages is reduced to the desired number of pages.

3. The non-transitory computer readable storage medium according to claim 1, wherein modifying the initial pagination arrangement by iteratively reducing the initial number of pages further comprises modifying the initial pagination arrangement through application of at least one of a stratified sampling, random sampling, and a sampling according to image importance operation.

4. The non-transitory computer readable storage medium according to claim 1, said one or more computer programs further comprising a set of instructions for:
   determining which of the images contained in the image collection are suitable for inclusion in the initial pagination arrangement prior to identifying the initial pagination arrangement based upon an identification of one or more characteristics of each of the images.

5. The non-transitory computer readable storage medium according to claim 4, wherein the one or more characteristics comprises image quality, image duplicates, groupability of the images, image importance and wherein determining which of the images contained in the image collection are suitable for inclusion in the initial pagination arrangement further comprises determining that images having one or more of relatively low image quality, at least one duplicate image, relatively low image importance, and being unable to be grouped with another image are to be omitted from the initial pagination arrangement.

6. The non-transitory computer readable storage medium according to claim 1, said one or more computer programs further comprising a set of instructions for:
   classifying images in the image collection that were not included in the initial pagination arrangement as being one or more of a relatively low quality image, a duplicate image, and an ungroupable image.

7. The non-transitory computer readable storage medium according to claim 6, said one or more computer programs further comprising a set of instructions for:
   determining whether the initial number of pages differs from the desired number of pages; and
   in response to the initial number of pages falling below the desired number of pages, modifying the initial pagination arrangement by adding one or more images classified as being ungroupable into the modified initial pagination arrangement to add one or more pages to the modified initial pagination arrangement until one of the modified initial number of pages equals the desired number of pages and the image collection contains no additional images classified as being ungroupable.

8. The non-transitory computer readable storage medium according to claim 7, said one or more computer programs further comprising a set of instructions for:
   in response to a determination that the image collection contains no additional images classified as being ungroupable and the modified initial number of pages falling below the desired number of pages, modifying the modified pagination arrangement by adding one or more images classified as being duplicates into the modified pagination arrangement to add one or more pages to the modified pagination arrangement until one of the modified initial number of pages equals the desired number of pages and the image collection contains no additional images classified as being duplicates.

9. The non-transitory computer readable storage medium according to claim 8, said one or more computer programs further comprising a set of instructions for:
   in response to a determination that the image collection contains no additional images classified as being duplicates and the modified initial number of pages falling below the desired number of pages, modifying the modified pagination arrangement by iteratively splitting one or more of the pages in the modified pagination arrangement into multiple pages to add one or more pages to the modified pagination arrangement until one of the modified initial number of pages equals the desired number of pages and the image collection contains no additional pages to be split.

10. The non-transitory computer readable storage medium according to claim 9, said one or more computer programs further comprising a set of instructions for:
    in response to a determination that the image collection contains no additional pages to be split, modifying the initial pagination arrangement by adding one or more classified as being of relatively low quality to the modified initial pagination arrangement until one of the modified initial number of pages equals the desired number of pages and the image collection contains no additional images classified as being of relatively low quality.

11. The non-transitory computer readable storage medium according to claim 10, said one or more computer programs further comprising a set of instructions for:
    in response to a determination that the image collection contains no additional images classified as being of relatively low quality for inclusion into the modified initial pagination arrangement, outputting an indication that the desired number of pages is unattainable.

12. A method for automatically and scalably selecting images from an image collection for inclusion in a photo album through implementation of a computer-implemented system, said method comprising:
    in the computer-implemented system,
       identifying an initial pagination arrangement containing a subset of all of the images contained in the image collection, wherein the initial pagination arrangement contains an initial number of pages;
       determining whether the initial number of pages is equivalent to a desired number of pages; and
       modifying the initial pagination arrangement in an automatic and scalable manner in response to the initial number of pages differing from the desired number of pages.

13. The method according to claim 12, further comprising:
    in the computer-implemented system,
       determining which of the images contained in the image collection are suitable for inclusion in the initial pagination arrangement prior to identifying the initial pagination arrangement based upon an identification of one or more characteristics of each of the images, wherein the one or more characteristics comprises image quality, image duplicates, groupability of the images, and importance of the images.

14. The method according to claim 13, further comprising:
    in the computer-implemented system,
       determining whether the initial number of pages exceeds the desired number of pages; and
       in response to a determination that the initial number of pages exceeds the desired number of pages, modifying the initial pagination arrangement by iteratively reducing the initial number of pages through a merging operation of the images contained in two or more of the pages until the initial number of pages is reduced to the desired number of pages.

15. The method according to claim 13, further comprising: in the computer-implemented system,
   determining that the initial number of pages falls below the desired number of pages; and
   iteratively adding ungroupable images until one of a modified number of pages equals the desired number of pages and additional ungroupable images are unavailable.

16. The method according to claim 15, further comprising: in the computer-implemented system,
   in response to a determination that the image collection contains no additional ungroupable images and the modified initial number of pages falling below the desired number of pages, iteratively adding one or more images classified as being duplicates into the modified pagination arrangement to add one or more pages to the modified pagination arrangement until one of the modified initial number of pages equals the desired number of pages and the image collection contains no additional images classified as being duplicates.

17. The method according to claim 16, further comprising: in the computer-implemented system,
   in response to a determination that the image collection contains no additional images classified as being duplicates and the modified initial number of pages falling below the desired number of pages, modifying the modified pagination arrangement by iteratively splitting one or more of the pages in the modified pagination arrangement into multiple pages to add one or more pages to the modified pagination arrangement until one of the modified initial number of pages equals the desired number of pages and the image collection contains no additional pages to be split.

18. The method according to claim 17, further comprising: in the computer-implemented system,
   in response to a determination that the image collection contains no additional pages to be split, modifying the initial pagination arrangement by adding one or more classified as being of relatively low quality to the modified initial pagination arrangement until one of the modified initial number of pages equals the desired number of pages and the image collection contains no additional images classified as being of relatively low quality; and
   in response to a determination that the image collection contains no additional images classified as being of relatively low quality for inclusion into the modified initial pagination arrangement, outputting an indication that the desired number of pages is unattainable.

19. A computing apparatus comprising:
   a memory storing code for,
     identifying an initial pagination arrangement containing a subset of all of the images contained in the image collection, wherein the initial pagination arrangement contains an initial number of pages;
     determining whether the initial number of pages is equivalent to a desired number of pages;
     modifying the initial pagination arrangement through an ordered and iterative modification operation in response to the initial number of pages differing from the desired number of pages to cause a modified pagination arrangement to have the desired number of pages; and
   a processor for executing the code stored in the memory to automatically selecting images from an image collection for inclusion in a photo album.

20. The computing apparatus according to claim 19, wherein the code stored in the memory for modifying the initial pagination arrangement further includes code for iteratively adding pages containing ungroupable images, iteratively adding duplicate images; iteratively splitting pages, and iteratively adding low quality images in an ordered manner when the initial number of pages falls below the desired number of pages.

* * * * *